(12) United States Patent
Kaikkonen et al.

(10) Patent No.: US 12,047,878 B2
(45) Date of Patent: Jul. 23, 2024

(54) REFERENCE SIGNAL CONFIGURATION FOR ENABLING ENERGY EFFICIENT SYSTEM OPERATION

(71) Applicant: NOKIA TECHNOLOGIES OY, Espoo (FI)

(72) Inventors: Jorma Johannes Kaikkonen, Oulu (FI); Timo Koskela, Oulu (FI); Lars Dalsgaard, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 601 days.

(21) Appl. No.: 17/253,934

(22) PCT Filed: Jun. 21, 2018

(86) PCT No.: PCT/EP2018/066643
§ 371 (c)(1),
(2) Date: Dec. 18, 2020

(87) PCT Pub. No.: WO2019/242862
PCT Pub. Date: Dec. 26, 2019

(65) Prior Publication Data
US 2021/0266835 A1    Aug. 26, 2021

(51) Int. Cl.
*H04W 52/02* (2009.01)
*H04L 5/00* (2006.01)

(52) U.S. Cl.
CPC ....... *H04W 52/0225* (2013.01); *H04L 5/0048* (2013.01); *H04W 52/0216* (2013.01)

(58) Field of Classification Search
CPC ......... H04W 52/0225; H04W 52/0216; H04W 76/28; H04L 5/0048; Y02D 30/70
See application file for complete search history.

(56) References Cited

U.S. PATENT DOCUMENTS

| 9,185,738 B2 | 11/2015 | Suzuki et al. |
| 9,763,172 B2 | 9/2017 | Vajapeyam et al. |
| 2015/0117286 A1 | 4/2015 | Kim et al. |

(Continued)

FOREIGN PATENT DOCUMENTS

| EP | 2 696 630 A1 | 2/2014 |
| EP | 2 712 263 A1 | 3/2014 |

(Continued)

OTHER PUBLICATIONS

Notice of Preliminary Rejection dated Jul. 29, 2021 corresponding to Korean Patent Application No. 2021-7001972, with English Summary thereof.

(Continued)

*Primary Examiner* — Quoc Thai N Vu
(74) *Attorney, Agent, or Firm* — SQUIRE PATTON BOGGS (US) LLP

(57) ABSTRACT

The present invention provides apparatuses, methods, computer programs, computer program products and computer-readable media regarding reference signal configuration for enabling energy efficient system operation. The apparatus comprises determining whether discontinuous reception is applied to the user equipment, and if it is determined that the discontinuous reception is applied, determining whether a signal is present outside of an active time of the user equipment.

13 Claims, 6 Drawing Sheets

(56) References Cited

U.S. PATENT DOCUMENTS

2016/0044740 A1* 2/2016 Siomina ............... H04W 76/14
455/552.1
2018/0317171 A1* 11/2018 Shan .................. H04W 68/005

FOREIGN PATENT DOCUMENTS

KR      2017-0041722 A      4/2017
WO     WO 2012/137295 A1   10/2012

OTHER PUBLICATIONS

Office Action dated Nov. 18, 2022, corresponding to Japanese Patent Application No. 2020-570673.
International Search Report and Written Opinion dated May 3, 2019 corresponding to International Patent Application No. PCT/EP2018/066643.
Notification of Ground of Rejection dated Feb. 9, 2022 corresponding to Japanese Patent Application No. 2020-570673, with English translation thereof.
3GPP TS 36.331 V15.2.0 (Jun. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Jun. 2018.
CATT, "Remaining Issues on NR Mobility Management," 3GPP Draft, R1-1806273, 3GPP TSG RAN WG1 Meeting #93, Busan, Korea, May 21-25, 2018.
Office Action dated Oct. 6, 2022, corresponding to Korean Patent Application No. 2022-7024477.
First Examination Report dated Jan. 5, 2022 corresponding to Indian Patent Application No. 202147000600.
Communication pursuant to Rule 164(2)(b) and Article 94(3) EPC dated Oct. 19, 2023 corresponding to European Patent Application No. 18735226.5.
Nokia et al., "Remaining issues on mobility measurements," 3GPP Draft; R1-1802895, 3GPP TSG-RAN WG1meeting #92, Athens, Greece, Feb. 26-Mar. 2, 2018, Feb. 16, 2018, XP051397376.
First Office Action dated Nov. 7, 2023 corresponding to Chinese Patent Application No. 201880096785.3, with English summary thereof.

* cited by examiner

Fig. 4

S41: determining whether discontinuous reception is applied to the user equipment, if it is determined that the discontinuous reception is applied, determining whether a signal is present outside of an active time of the user equipment

REFERENCE SIGNAL CONFIGURATION FOR ENABLING ENERGY EFFICIENT SYSTEM OPERATION

TECHNICAL FIELD

Various example embodiments relate to apparatuses, methods, systems, computer programs, computer program products and computer-readable media regarding reference signal configuration for enabling energy efficient system operation.

Abbreviations and Definitions

3GPP 3$^{rd}$ Generation Partnership program
BM Beam Management
CORESET Control Resource Set
CRS Cell-specific Reference Signals
CSI Channel State Information
C-DRX Connected mode DRX
DL Downlink
DRX Discontinuous Reception
DTX Discontinuous Transmission
FR Frequency Range
gNB Next Generation NodeB
LTE Long Term Evolution
MAC-CE Medium Access Control-Control Element
NR New Radio
PDCCH Physical Downlink Control Channel
PDSCH Physical Downlink Shared Channel
PUCCH Physical Uplink Control Channel
QCL Quasi co-location
RRM Radio Resource Management
RS Reference Signal
RSRP Reference Signal Received Power
SS Synchronization Signal
SSB Synchronization Signal Block
TCI Transmission Configuration Indication
TXRU Transceiver Unit
UE User Equipment
UL Uplink

BACKGROUND

Certain aspects of the present invention relate to 3GPP NR physical layer design. More specifically, certain aspects of the present invention relate to UE behavior when performing beam management and/or L3 mobility measurements and reporting and/or scheduling while being configured with C-DRX.

SUMMARY

It is an object of various example embodiments to provide apparatuses, methods, systems, computer programs, computer program products and computer-readable media regarding reference signal configuration for enabling energy efficient system operation.

According to an aspect of various example embodiments there is provided a method comprising:
 determining whether discontinuous reception is applied to the user equipment, and
 if it is determined that the discontinuous reception is applied, determining whether a signal is present outside of an active time of the user equipment.

According to another aspect of various example embodiments there is provided a method comprising:
 detecting a time window during which there exists a channel state information reference signal, CSI-RS,
 detecting a length of a discontinuous reception cycle, DRX cycle, applied to the user equipment,
 wherein the length of the time window depends on the length of the DRX cycle.

According to an aspect of various example embodiments there is provided an apparatus comprising:
 at least one processor,
 and
 at least one memory for storing instructions to be executed by the processor, wherein
 the at least one memory and the instructions are configured to, with the at least one processor, cause the apparatus at least to perform:
 determining whether discontinuous reception is applied to the user equipment, and
 if it is determined that the discontinuous reception is applied, determining whether a signal is present outside of an active time of the user equipment.

According to another aspect of various example embodiments there is provided an apparatus comprising:
 at least one processor,
 and
 at least one memory for storing instructions to be executed by the processor, wherein
 the at least one memory and the instructions are configured to, with the at least one processor, cause the apparatus at least to perform:
 detecting a time window during which there exists a channel state information reference signal, CSI-RS,
 detecting a length of a discontinuous reception cycle, DRX cycle, applied to the user equipment,
 wherein the length of the time window depends on the length of the DRX cycle.

According to an aspect of various example embodiments there is provided an apparatus comprising:
 means for determining whether discontinuous reception is applied to the user equipment, and
 if it is determined that the discontinuous reception is applied, determining whether a signal is present outside of an active time of the user equipment.

According to an aspect of various example embodiments there is provided an apparatus comprising:
 means for detecting a time window during which there exists a channel state information reference signal, CSI-RS,
 means for detecting a length of a discontinuous reception cycle, DRX cycle, applied to the user equipment,
 wherein the length of the time window depends on the length of the DRX cycle.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to an aspect of various example embodiments there is provided a computer readable medium storing a computer program as set out above.

Further aspects and features of the present invention are set out in the dependent claims.

BRIEF DESCRIPTION OF THE DRAWINGS

These and other objects, features, details and advantages will become more fully apparent from the following detailed description of various aspects/embodiments which is to be taken in conjunction with the appended drawings, in which:

FIG. 4 is a flowchart illustrating an example of a method according to certain aspects of the present invention.

DETAILED DESCRIPTION

Figure 1:
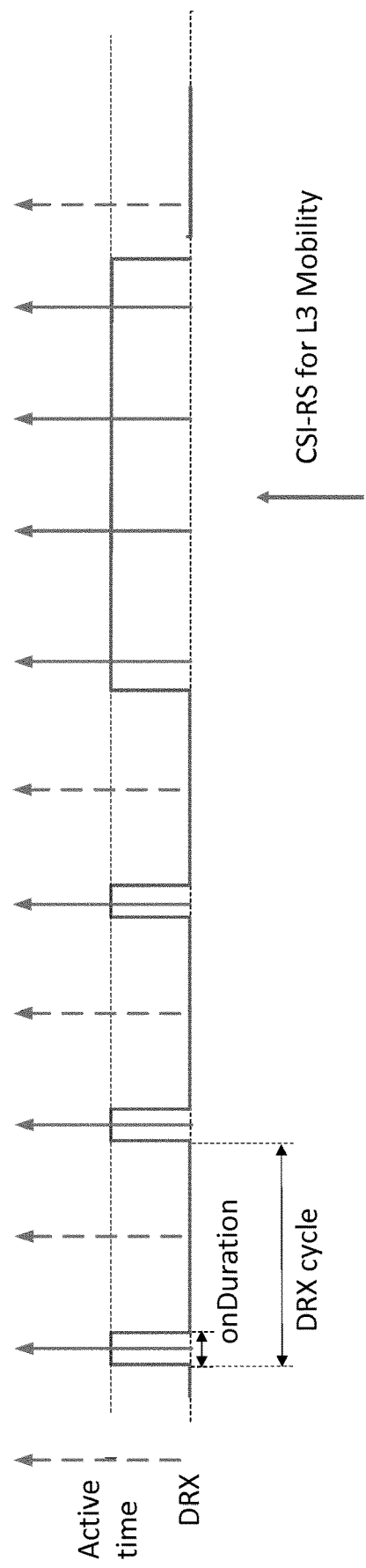
FIG. 1 is a diagram illustrating a CSI-RS periodicity and an UE C-DRX cycle.

The present disclosure is described herein with reference to particular non-limiting examples and to what are presently considered to be conceivable embodiments. A person skilled in the art will appreciate that the present disclosure is by no means limited to these examples and embodiments, and may be more broadly applied.

In the following, some example versions of the disclosure and embodiments are described with reference to the drawings. For illustrating the various embodiments, the examples and embodiments will be described in connection with a cellular communication network based on a 3GPP based communication system, for example an LTE/LTE-A based system, a 5G/NR system or the like. As such, the description of example embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or example embodiments described herein are applicable to it. Further, it is to be noted that the various embodiments are not limited to an application using such types of communication systems or communication networks, but is also applicable in other types of communication systems or communication networks.

LTE Connected mode DRX was determined to allow an UE to monitor PDCCH in a discontinuous manner according to the rules and parameters defined in TS 36.321 Section 5.7. When the UE is not required to monitor PDCCH, it may turn off its receiver hardware and reduce the receiver power consumption. The most relevant ones of the parameters given in TS 36.321 (Section 5.7) are as follows:

drx-InactivityTimer, which determines how soon after ceasing of DL and/or UL activity, the UE may start to apply the discontinuous PDCCH monitoring. Once the drx-InactivityTimer has expired, the UE is required to monitor the PDCCH only during onDurationTimer once every DRX cycle. Two different DRX cycles can be configured; shortDRX-Cycle (optional) and longDRX-Cycle.

The PDCCH discontinuous monitoring pattern according to shortDRX-Cycle is applied first (if configured) and followed by longDRX-Cycle.

onDurationTimer determines the minimum active time the UE needs to monitor the PDCCH (unless not required by other rules) every DRX cycle.

When there is no shortDRX-Cycle defined or the drxShortCycleTimer (determining how soon after applying short DRX cycle UE may start to use long DRX) has expired, the UE may start to monitor PDCCH in a discontinuous manner according to longDRX-Cycle.

The DRX cycle specifies the periodic repetition of the on duration followed by a possible period of inactivity.

Another relevant rule in the context of this example embodiment is that if a new transmission is indicated to the UE by the PDCCH (either in DL or in UL), the UE needs to re-start the drx-InactivityTimer.

The following agreement related to C-DRX and CSI-RS measurement with L3 mobility was made in RAN1 #90:

UE is not required to measure CSI-RS configured for L3 mobility outside the active time Note that the exact definition of C-DRX active time depends on RAN2

In this context, the active time referred by RAN1 relates to the time when UE is monitoring PDCCH in onDuration or due to any timer triggered by gNB activity I.e. when any of 'onDurationTimer', 'drx-InactivityTimer' or 'drx-RetransmissionTimer' is running FFS (for further study):

whether CSI-RS for L3 mobility is configured only within C-DRX UE's active time for C-DRX operation whether UE should not assume that configured CSI-RS resources for L3 mobility are present outside the active time.

In the same meeting (RAN1 #90) agreements on RS that could be used for BM were reached:

Support L1-RSRP reporting of measurements on SS block for beam management procedures The following configurations for L1-RSRP reporting for beam management are supported SS block only (with mandatory support by UE)

CSI-RS only (with mandatory support by UE)

SS block+CSI-RS independent L1 RSRP reporting

Joint L1-RSRP using QCL-ed SS-block+CSI-RS is optionally supported by UE (with optionally support by UE).

In the following, the agreements related to C-DRX in RAN2 #75bis are described:

A MAC entity can be in one DRX state (i.e. single on/off time) at any given time. FFS, if multiple configuration are supported.

When MAC entity is awake, it monitors "PDCCH" occasion.

In NR, a DRX configuration is described by at least the following configuration parameters: an on duration time, an inactivity time, a retransmission time, short DRX cycles, long DRX cycles.

One of the targets of NR was to reduce network energy consumption. One approach to enable this was to reduce the amount and periodicity of always-on signals. C-DRX is an attractive feature for UE power consumption improvement, enabling the UE to be kept in CONNECTED mode to minimize the latencies. In LTE, where CRS were always available, there was no need to account the UE DRX activity in the transmission of the RS. In NR, only always-on signals are SSBs and CSI-RS are only present if configured. From an operation perspective, the required measurement periodicity and activity are different, i.e. DRX UEs can be allowed to measure less frequently as they do not have any data activity, while more frequent measurements are needed when UE has data activity. Current agreements for CSI-RS configurations limit network basically to few options:

either have very infrequent CSI-RS resources with periodicities, corresponding to being configured based on the C-DRX cycle (even if the UE is active), reducing the overhead but increasing latencies for measurements/reporting, and the measurement reporting would be dependent on the CSI-RS periodicity, or have CSI-RS configured with periodicity that meets the targets of the e.g. BM (beam management) latencies, but enforce the network to have these CSI-RS always-on with said periodicity, without any impact to the C-DRX UE measurement performance (as UEs are only required to perform measurements during onDuration/active time), or configure and re-configure the CSI-RS resources periodicity at every transition point, when UE enters/leaves DRX.

So, in further detail, as presented in the past contributions, since RAN1 #90 and earlier (e.g. from R1-178616 and R1-1807175, by Nokia) the open aspects in terms of UE behavior related to FFS points above in agreement made in RAN1 #90, there is considered the way network can configure the CSI-RS e.g. for L3 mobility or beam management or scheduling and UE assumptions regarding the presence of configured CSI-RS resources outside the active time. As noted in the sub bullet of the agreement, in this context the active time is referred to the time when UE is monitoring PDCCH based on onDurationTimer or due to any timer triggered by gNB activity.

It is also good to note that the LTE RRM requirements defined in TS 36.133 assume C-DRX being configured, and the performance requirements are determined based on the active time of the DRX cycle. In most test cases, UE is being addressed by PDCCH continuously (to keep drx-InactivityTimer running) and prevent the UE to start discontinuous monitoring and the performance requirements are the same as with no C-DRX being configured.

Thus, rules determining the UE behavior (i.e. PDCCH monitoring) result that if there is data activity and UE is scheduled more or less continuously (at least once every drx-InactivityTimer, before it expires), the UE will stay in active time and monitor the PDCCH. It is also clear, that from user experience perspective, when there is data activity, the mobility measurement criterions should be also tighter. The performance requirements in RAN4 determine that the UE mobility measurement requirements shall follow the same baseline as in a case when no C-DRX is configured. When UE is allowed to start the discontinuous monitoring (DRX) e.g. there has not been PDCCH activity addressing the UE for the duration drx-InactivityTimer, the impact of prolonged mobility procedures to user experience is less severe, and UE can be allowed to perform measurements less frequently (as per RAN4 requirements).

Based on this discussion, the requirement that network is only allowed to configure CSI-RS resources on UE's active time, and if network wants to ensure the mobility performance matching the data activity of the UE, it would be potentially required to do a CSI-RS resource (e.g. for L3 mobility or beam management or scheduling) reconfiguration at every transition point (DRX ON-OFF-ON). That is, when there has not been any data activity for the duration of the configured inactivity timer duration, the UE would enter in DRX mode and be allowed to discontinuously monitor PDCCH, the network would need to re-configure the CSI-RS resources and apply a periodicity corresponding to configured DRX cycle. Naturally, any activity would extend the active time (due to resetting the drx-InactivityTimer). Respectively, when the data activity starts, and network would like to ensure the mobility performance by enabling UE to do more frequent CSI-RS measurements, the network would need to do a re-configuration and change the periodicity of the CSI-RS (to be more frequent). In case of short transmission burst, the result would be consecutive and frequent reconfigurations, which increases signaling overhead and energy consumption.

Naturally, the network could use a single configuration, corresponding to the active time that can be assumed always, i.e. the onDurationTimer that is applied at every longDRX-Cycle. This would imply that the CSI-RS based mobility performance would be restricted even during the active time due to static configuration based on DRX cycle.

Hence, a requirement that the network can only configure CSI-RS resources within UE's active time will severely hinder the use of CSI-RS for L3 mobility or beam management or scheduling.

Such an approach may also add restrictions to the whole system configuration flexibility as there would be needed some links between UE active time or DRX and then the CSI-RS configuration and finally the UE mobility performance and robustness. Such linkage is not attractive and complicates the system design.

Thus, to preserve network side flexibility for CSI-RS configuration and minimize the need for change/adaption of the configuration based on UE DRX configuration, it is preferred that network can configure CSI-RS for L3 mobility, beam management and/or scheduling in a more flexible manner.

There should not be any restrictions for the network not to configure CSI-RS resources outside of UE active periods as the UE DRX configuration may change, but there would not be a need to adapt CSI-RS configuration. As described above, for active data transmission, it is preferable to be able to update the active beam for data sufficiently frequently and in order to do that, frequent RS (i.e. CSI-RS) need to be sent to enable measurements and reporting. However, such configuration will result in significant resource overhead, and should not be required to be maintained needlessly. Hence, if the UE is configured with C-DRX, and the data activity ceases, allowing the UE to start preserving power, there is no need to have these resources present, as already agreed, and the UE is not required to measure CSI-RS outside the active time. To prevent this overhead, as discussed above, the network would need to change the configuration at the end of the data activity (RRC signaling), and when data activity is started, to change the configuration again e.g. at the beginning of onDuration. This would result in significant RRC overhead and would not be desirable. So, the CSI-RS resource configuration should remain under network control and can be configured independently of C-DRX.

Now assuming that network has full flexibility to configure the CSI-RS resources, independently of C-DRX, as proposed above and accounting to the agreement in last meeting that UE is not required to measure CSI-RS outside the active time (enabling UE to preserve power while applying discontinuous PDCCH monitoring), the question remains what should be the assumption regarding the CSI-RS resources occurring outside the active time. In LTE, the UE has the full flexibility to do the measurements, even outside the active time, due to the presence of always on RS, CRS.

In NR, the only always on signal is in principle the SS block, while CSI-RS transmission depend on network configuration. Thus, unlike in LTE CRS, UE in NR cannot take any pre-assumptions regarding the CSI-RS and therefore would always need to perform measurements based on the given configuration by NW.

Therefore, determining that the UE may not assume that CSI-RS are present outside the active time would not result in any significant complication in UE behavior, but would in turn enable network to preserve resources and energy by omitting the transmission of CSI-RS that occur outside the UE active time.

FIG. 1 shows an example in which the network transmits periodically the CSI-RS e.g. for L3 mobility, beam management and/or scheduling. The UE should not assume that the resources indicated by dashed arrows would be present and use only those resources that occur within the active time (indicated by solid arrows).

Hence, it has been proposed that the UE should not assume the presence of the configured CSI-RS resource e.g. for L3 mobility outside the Connected mode DRX active time. However, this has not been agreed in RAN1 so far.

To enable gNB power saving, an alternative approach is proposed according to certain embodiments of the present invention.

Additionally, and especially for FR2 (Frequency Range 2 in NR i.e. above 6 GHz), a UE entering DRX mode for power saving, may effectively turn off its receiver chain completely—i.e. the UE may not receive any signals. This may include any downlink reference signals (DL RS) such as CSI-RS and/or SS/PBCH block. In FR2, the UE will be applying UE Rx beam forming (in FR1 UE is assume to have omni directional antenna pattern) and will have more than one antenna panel (this is the baseline assumption in RAN4 and what is used when defining the UE requirements in RAN4 for FR2).

However, as described above, the UE must wake up and be able to receive DL scheduling signals/requests at least during each on duration of the DRX cycle.

However, prior to this, the UE must also have the opportunity to measure and refine/detect which Rx beam would be best for DL reception, in other words UE would need to be able to determine whether its RX beam is aligned for PDCCH reception when it enters the active time of the DRX cycle. If the DL RS (CSI-RS) are not present outside the active time this may not be possible.

According to certain aspect of the present invention, it is proposed to determine that the presence of (the configured) CSI-RS resources outside the active time (with C-DRX) depends on the period/length of applied DRX cycle. If the applied C-DRX cycle length is below a certain threshold, the UE is able to assume that the configured CSI-RS resources configured by network are present all the time, while if the length of the C-DRX cycle exceeds the threshold, these resources would not be assumed to be present.

The methods of the invention are described using the C-DRX (Connected Mode DRX) as an example but the methods can be applied in similar manner for the IDLE mode DRX, if UE can determine or retain the reference signal configuration in IDLE mode as well. In an example, UE may retain the CSI-RS configuration obtained in connected mode or UE may determine beam management/L3 mobility reference signal configuration from broadcast information (system information, SIBs). In IDLE mode DRX cycle, the active time corresponds to the occasions where UE is configured to monitor PDCCH for paging message reception. Outside the active time, UE is not required to monitor PDCCH but may need to perform measurements for beam management and layer 3 mobility. Also, in addition to IDLE and CONNECTED mode DRX, the methods may also be applied for inactive mode in case UE can assume mobility (or beam management) reference signal configuration (CSI-RS configuration) also in inactive mode and DRX is applied.

According to other certain aspects of the present invention, the UE could assume that the configured CSI-RS resources would be present outside onDuration, if short-DRX-cycle is applied for PDCCH monitoring, and the resources would be only present in onDuration time, when longDRX-cycle is applied for PDCCH monitoring.

According to a further aspect of the present invention, a time window is configured during which the UE can assume CSI-RS resources at least being present. Such window could depend on the applied DRX cycle where the time window could be the same or longer than onDuration and/or cover the onDuration. The time window could also cover a certain time prior to the onDuration and could also overlap with the onDuration.

The period, or window length, during which the UE can expect the CSI-RS to be present, may depend on the length of the UE inactive time and/or DRX periodicity. That is, if the DRX cycle is below a certain period, the CSI-RS presence, the window length, would e.g. be X, while if the DRX cycle is above a certain threshold, the CSI-RS presence period could be e.g. 2X. The window length may be expressed in slots, subframes, milliseconds, or symbol times or the like). There could be one or more thresholds linked with one or more CSI-RS presence periods.

According to the above-described methods, the presence of the CSI-RS resources could be adjusted further based on activity of some timers, such as inactivity timer running or being reset.

In a first example according to certain aspects of the present invention, the presence (whether CSI-RS are present outside active time) of CSI-RS resource per DRX cycle i.e. short/long is configured per CSI-RS resource. This may be signaled as part of CSI-RS configuration or as a DRX configuration (RRC information elements). In case the configuration is part of the CSI-RS resource configuration, a specific field may be used to indicate whether the resource can be expected to be present outside the active time (or, during the time window described herein). Presence of CSI-RS may also be a part of the DRX configuration.

Three options can be signaled as part of the CSI-RS resource or resource set configuration (short, long, notPresent). For example, in case the short DRX cycle is configured, UE can assume the resources or resource sets to be present in short DRX. NotPresent indicates that the resource cannot be assumed to be present outside active time. Further, in case the long DRX is indicated, UE can assume the CSI-RS to be present also during long DRX. A CSI-RS resource may be configured to be present also during short and long DRX.

Alternatively, this could be specified as (or in addition to a configuration) as a UE requirement or behavior. E.g. based on the CSI-RS configuration the UE would use a number of the configured CSI-RS prior to the active time. The number could be specified.

In a second example according to certain aspects of the present invention, the set of CSI-RS may be a subset or different in short and long DRX and active mode in a manner that:

In short DRX, the UE can assume a CSI-RS resource or a set of CSI-RS resources (setCSI-RS_1) and in long DRX, the UE can assume setCSI-RS_2 where the resources have NO overlap, or overlap partly/completely (some or all of the CSI-RS signals are same in both sets). Or the configuration may be indicated to be similar as configured in active time (which may be a setCSI-RS_3).

Alternatively, the UE can assume the set of setCSI-RS_1a in short DRX and setCSI-RS_1b in long DRX, where the setCSI-RS_1b is a subset of setCSI-RS_1a In a third example according to certain aspects of the present invention, the network configures the UE with a RS window during which the UE can expect e.g. CSI-RS to be present. In the first example, this RS window can be aligned/overlapping with On-duration. In the second example, this RS window can be partly overlapping with On-duration and preceding it. In the third example, this RS window can be stand-alone (not always/at all aligned/overlapping with On-duration).

A fourth example according to the present invention is a combination of these 3 examples. This is illustrated in FIG. 2.

Figure 2:
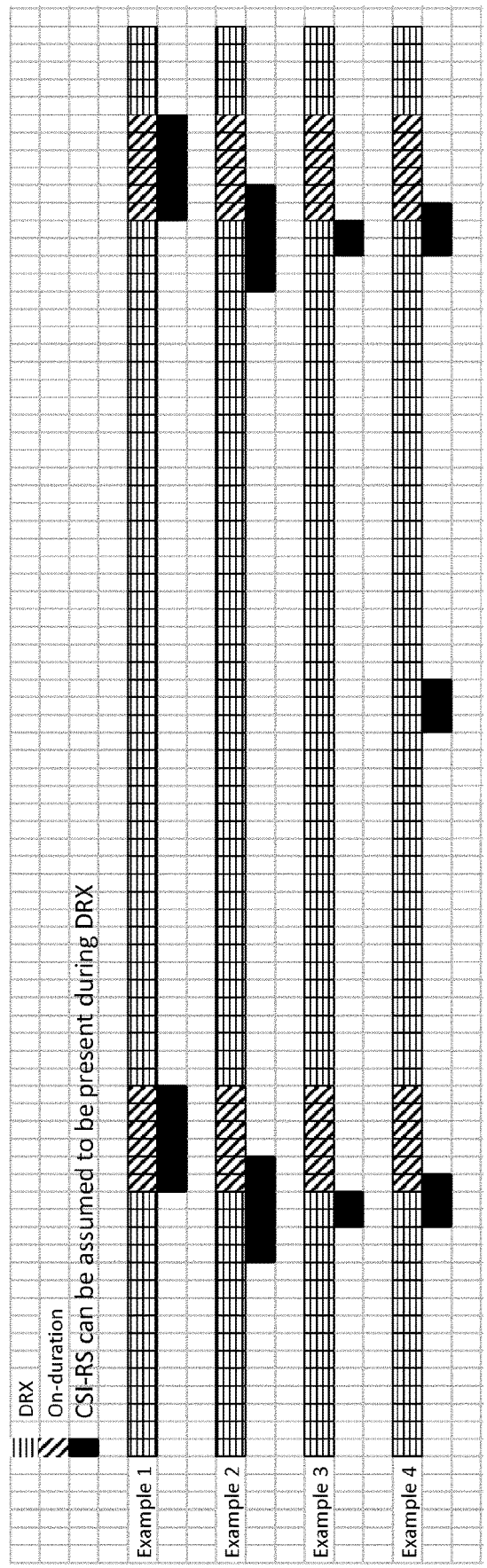
FIG. 2 is a diagram illustrating an example of a CSI-RS presence window according to certain aspects of the present invention.

FIG. 2 shows an illustration of the CSI-RS presence window according to the above-described examples 1 to 4.

Allowing the configured CSI-RS resources to be dynamically disabled (not transmitted) by network outside the active time, would enable the network to improve resource utilization and reduce overhead (by reducing CSI-RS transmission and transmitting something else e.g. data to other users), and/or preserve power in case there is nothing else to be transmitted by disabling the transmitter, without introducing frequent (RRC based) re-configurations.

Figure 3:
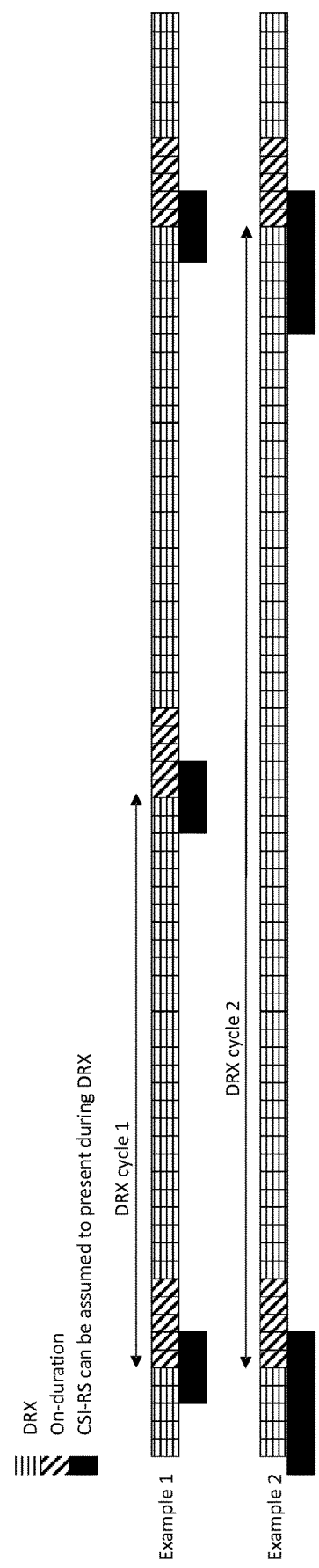
FIG. 3 is a diagram illustrating a relation between the CSI-RS present time window and the DRX cycle length according to certain aspects of the present invention.

Next, FIG. 3 illustrates the CSI-RS presence period as a function of the DRX cycle using one threshold and two different DRX cycles (as non-limiting example).

In the example in FIG. 3, the CSI-RS presence time or window depends on the DRX cycle length. In the example 2 compared to example 1 in FIG. 3, the CSI-RS presence window length doubles as the DRX cycle length is doubled. That is, there is a linear dependency (in this example) between how long time the CSI-RS is present in conjunction with an on-duration and the DRX cycle length. Other stepwise approaches are also possible—i.e. dependency need not be linear but could be based on a table as illustrated below.

| DRX cycle | CSI - RS presence |
|---|---|
| No DRX | N/A |
| DRX cycle ≤ 320 ms | 5 ms |
| DRX cycle > 320 ms | 10 ms |

That is, as shown in the above table, if the DRX cycle exceeds a certain threshold (320 ms in the example shown in the table, which is not limiting, but every other suitable threshold value can be used), the CSI-RS is present for a longer time than if the DRX cycle is below the threshold, and without a DRX cycle, no CSI-RS is present.

In the following, a more general description of example versions of the present invention is made with respect to FIG. 4 to . . . .

FIG. 4 is a flowchart illustrating an example of a method according to some example versions of the present invention.

According to example versions of the present invention, the method may be implemented in or may be part of a user equipment, or the like. The method comprises determining (S41) whether discontinuous reception is applied to the user equipment, and if it is determined that the discontinuous reception is applied, determining whether a signal is present outside of an active time of the user equipment.

According to some example versions of the present invention, the method further comprises detecting a length of a discontinuous reception cycle, DRX cycle, applied to the user equipment for monitoring the downlink channel, and determining whether or not there exists the signal outside of the active time within the DRX cycle based on the detected length of the DRX cycle.

According to some example versions of the present invention, the active time is a period during which the user equipment monitors a downlink channel.

4 According to some example versions of the present invention, the method further comprises if the DRX cycle applied to the user equipment corresponds to a short DRX cycle, determining that the signal is present outside of the active time, and if the DRX cycle applied to the user equipment corresponds to a long DRX cycle, determining that the signal is only present during the active time.

According to some example versions of the present invention, if the DRX cycle applied to the user equipment corresponds to a short DRX cycle, it is determined that a first set of signals is present, if the DRX cycle applied to the user equipment corresponds to a long DRX cycle, it is determined that a second set of signals is present, and the first set and the second set have no overlap or a partly overlap with each other.

According to some example versions of the present invention, if the DRX cycle applied to the user equipment corresponds to a short DRX cycle, it is determined that a first set of signals is present, if the DRX cycle applied to the user equipment corresponds to a long DRX cycle, it is determined that a second set of signals is present, and the second set is a subset of the first set.

According to some example versions of the present invention, the method further comprises comparing the detected length of the DRX cycle with a predetermined threshold, and determining whether or not there exists a signal, based on the comparison between the detected length of the DRX cycle and the predetermined threshold.

According to some example versions of the present invention, the method further comprises if it is determined that the length of the DRX cycle is below the threshold, determining that the signal is present, and if it is determined that the length of the DRX cycle exceeds the threshold, determining that the signal is not present.

According to some example versions of the present invention, the signal is a reference signal, RS.

According to some example versions of the present invention, the signal is a channel state information reference signal, CSI-RS.

According to some example versions of the present invention, the downlink channel is a physical downlink control channel, PDCCH.

According to some example versions of the present invention, the length of the DRX cycle is indicated as a part of a CSI-RS configuration or a DRX configuration in a radio resource configuration information element, RRC IE.

According to some example versions of the present invention, the RRC IE indicates that the length of the DRX cycle is short, long, or that the CSI-RS is not present.

According to some example versions of the present invention, the discontinuous reception is a connected mode discontinuous reception, C-DRX, and applied to the user equipment for monitoring the downlink channel.

According to some example versions of the present invention, the discontinuous reception is an IDLE mode discontinuous reception, and applied to the user equipment for monitoring the downlink channel.

Figure 5:
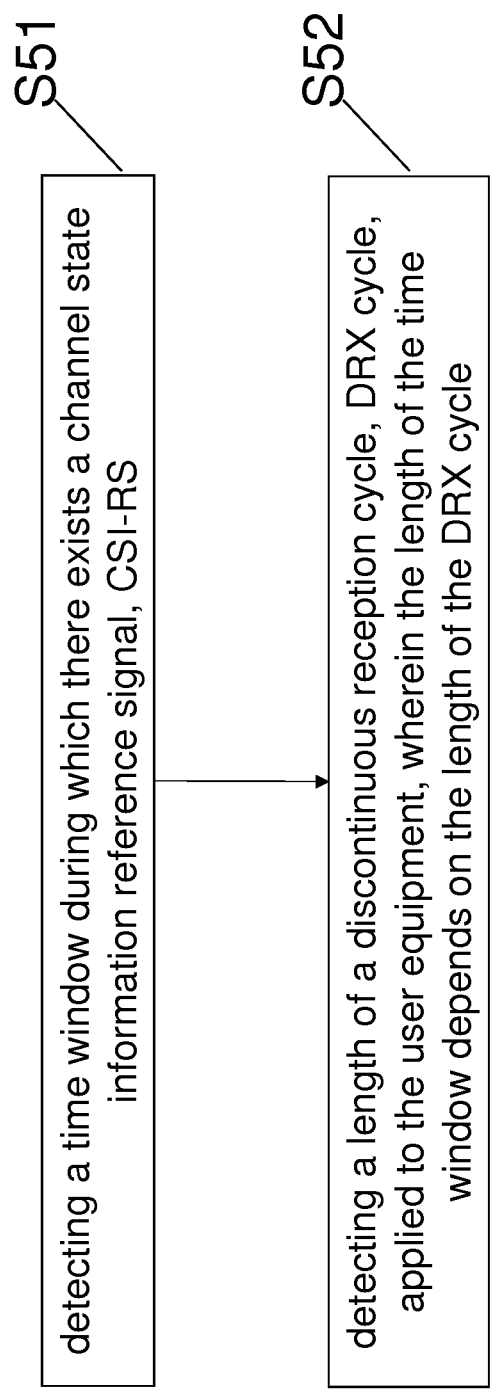
FIG. 5 is a flowchart illustrating another example of a method according to certain aspects of the present invention.

FIG. 5 is a flowchart illustrating another example of a method according to some example versions of the present invention.

According to example versions of the present invention, the method may be implemented in or may be part of a user equipment, or the like. The method comprises detecting (S51) a time window during which there exists a channel state information reference signal, CSI-RS, detecting (S52) a length of a discontinuous reception cycle, DRX cycle, applied to the user equipment, wherein the length of the time window depends on the length of the DRX cycle.

According to some example versions of the present invention, the longer the length of the DRX cycle, the longer the time window.

According to some example versions of the present invention, if the length of the DRX cycle exceeds a predetermined threshold, the time window is longer than if the length of the DRX cycle is below the predetermined threshold.

According to some example versions of the present invention, the time window is at least one of aligned and overlapping with an active time, wherein the active time is a period during which the user equipment monitors a downlink channel; at least partly overlapping with the active time; immediately prior to the active time without overlapping with the active time; and not overlapping with the active time.

According to some example versions of the present invention, the signal is a reference signal, RS.

According to some example versions of the present invention, the signal is a channel state information reference signal, CSI-RS.

According to some example versions of the present invention, the downlink channel is a physical downlink control channel, PDCCH.

According to some example versions of the present invention, the discontinuous reception is connected mode discontinuous reception, C-DRX, and applied to the user equipment for monitoring the downlink channel.

According to some example versions of the present invention, the discontinuous reception is an IDLE mode discontinuous reception, and applied to the user equipment for monitoring the downlink channel.

Figure 6:
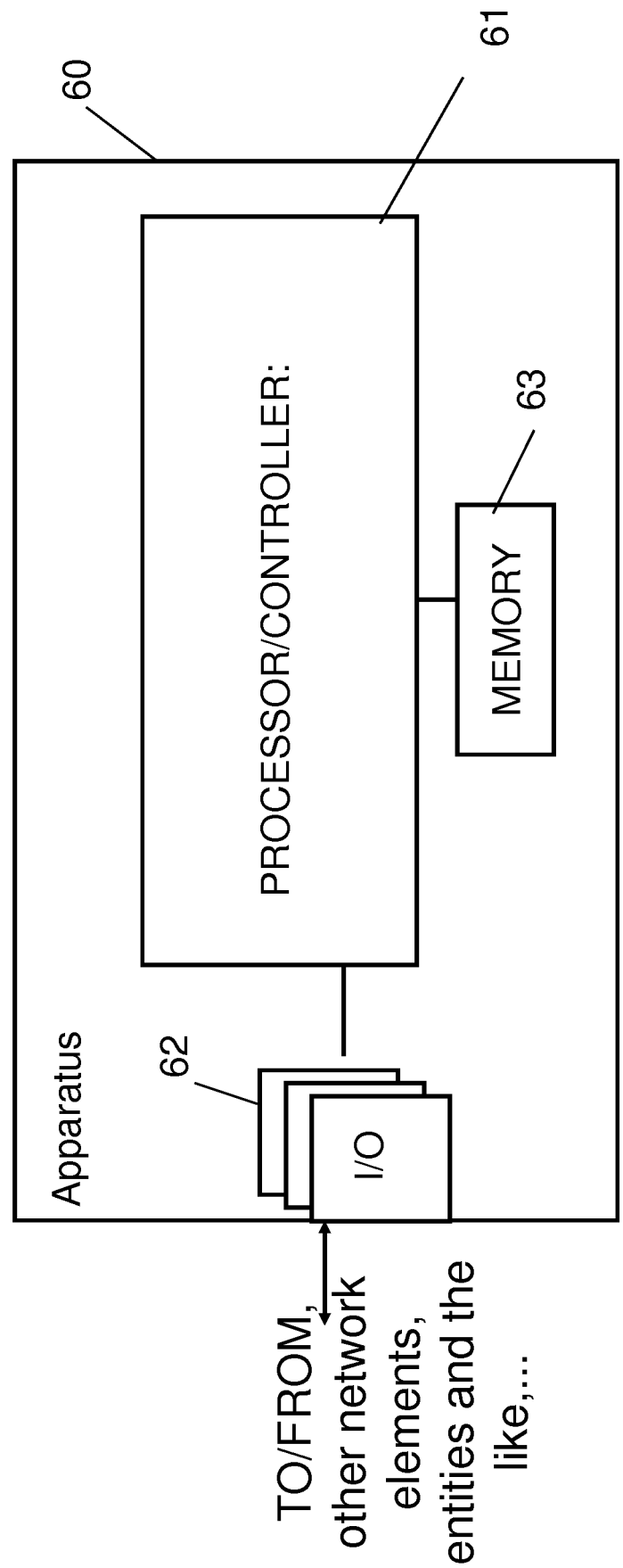
FIG. 6 is block diagram illustrating an example of an apparatus according to certain aspects of the present invention.

FIG. 6 is a block diagram illustrating another example of an apparatus according to some example versions of the present invention.

In FIG. 6, a block circuit diagram illustrating a configuration of an apparatus 60 is shown, which is configured to implement the above described various aspects of the invention. It is to be noted that the apparatus 60 shown in FIG. 6 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 60 may comprise a processing function or processor 61, such as a CPU or the like, which executes instructions given by programs or the like. The processor 61 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 62 denotes transceiver or input/output (I/O) units (interfaces) connected to the processor 61. The I/O units 62 may be used for communicating with one or more other network elements, entities, terminals or the like. The I/O units 62 may be a combined unit comprising communication equipment towards several network elements, or may comprise a distributed structure with a plurality of different interfaces for different network elements. The apparatus 60 further comprises at least one memory 63 usable, for example, for storing data and programs to be executed by the processor 61 and/or as a working storage of the processor 61.

The processor 61 is configured to execute processing related to the above-described aspects.

In particular, the apparatus 60 may be implemented in or may be part of a user equipment or the like, and may be configured to perform processing as described in connection with FIGS. 4 and 5.

Further, the present invention may be implement by an apparatus comprising means for preforming the above-described processing.

That is, the apparatus comprises means for determining whether discontinuous reception is applied to the user equipment, and if it is determined that the discontinuous reception is applied, determining whether a signal is present outside of an active time of the user equipment.

Further, the apparatus comprises means for detecting a time window during which there exists a channel state information reference signal, CSI-RS, means for detecting a length of a discontinuous reception cycle, DRX cycle, applied to the user equipment, wherein the length of the time window depends on the length of the DRX cycle.

For further details regarding the functions of the apparatus, reference is made to the description of the methods according to some example versions of the present invention as described in connection with FIGS. 4 and 5.

In the foregoing exemplary description of the apparatus, only the units/means that are relevant for understanding the principles of the invention have been described using functional blocks. The apparatus may comprise further units/ means that are necessary for its respective operation, respectively. However, a description of these units/means is omitted in this specification. The arrangement of the functional blocks of the apparatus is not to be construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is to be construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components, APU (Accelerated Processor Unit), GPU (Graphics Processor Unit) or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is to be noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a user equipment, said method comprising:
determining whether discontinuous reception is applied to the user equipment, in which the user equipment monitors a downlink channel during an active time of a discontinuous reception (DRX) cycle; and
in response to it being determined that the discontinuous reception is applied, detecting a length of the DRX cycle and determining whether a channel state information (CSI) signal is present outside of the active time of the user equipment based on a comparison between the detected length of the DRX cycle and a predetermined threshold, wherein it is determined that the CSI signal is present outside of the active time if the length of the DRX cycle is below the threshold, and determined that the CSI signal is not present outside of the active time if the length of the DRX cycle is above the threshold.

2. The method according to claim 1, wherein the downlink channel is a physical downlink control channel (PDCCH).

3. The method according to claim 1, wherein the length of the DRX cycle is indicated as a part of a CSI-RS configuration or a DRX configuration in a radio resource configuration information element (RRC IE).

4. The method according to claim 1, wherein the discontinuous reception is a connected mode discontinuous reception (C-DRX), and applied to the user equipment for monitoring the downlink channel.

5. The method according to claim 1, wherein the discontinuous reception is an IDLE mode discontinuous reception, and applied to the user equipment for monitoring the downlink channel.

6. An apparatus, comprising:
at least one processor; and
at least one memory including computer program code;
the at least one memory and the computer program code configured to, with the at least one processor, cause the apparatus at least to perform:
determining whether discontinuous reception is applied to the user equipment, in which the user equipment monitors a downlink channel during an active time of a discontinuous reception (DRX) cycle; and
if it is determined that the discontinuous reception is applied, detecting a length of the DRX cycle and determining whether a channel state information (CSI)

signal is present outside of the active time of the user equipment based on a comparison between the detected length of the DRX cycle and a predetermined threshold, wherein it is determined that the signal is present outside of the active time if the length of the DRX cycle is below the threshold, and determined that the signal is not present outside of the active time if the length of the DRX cycle is above the threshold.

7. The apparatus according to claim 6, wherein
the downlink channel is a physical downlink control channel (PDCCH).

8. The apparatus according to claim 6, wherein
the length of the DRX cycle is indicated as a part of a CSI-RS configuration or a DRX configuration in a radio resource configuration information element (RRC IE).

9. The apparatus according to claim 6, wherein
the discontinuous reception is a connected mode discontinuous reception (C-DRX), and applied to the user equipment for monitoring the downlink channel.

10. The apparatus according to claim 6, wherein
the discontinuous reception is an IDLE mode discontinuous reception, and applied to the user equipment for monitoring the downlink channel.

11. A computer program embodied on a non-transitory computer-readable medium, said computer program comprising computer readable code for use with a computer, the computer program, when executed on a computer, causing the computer to perform the method of claim 1.

12. The method of claim 1, further comprising:
perform a measurement outside the active time based on the determinization the length of the DRX cycle is below the threshold.

13. The apparatus of claim 6, wherein the at least one memory and the computer program code are further configured to, with the at least one processor, cause the apparatus at least to perform:
perform a measurement outside the active time based on the determinization the length of the DRX cycle is below the threshold.

* * * * *